United States Patent
Kim et al.

(10) Patent No.: US 10,181,960 B2
(45) Date of Patent: Jan. 15, 2019

(54) METHOD AND APPARATUS FOR CONFIGURING AND RECOMMENDING DEVICE ACTION USING USER CONTEXT

(71) Applicant: Samsung Electronics Co., Ltd., Suwon-si, Gyeonggi-do (KR)

(72) Inventors: Kyungjae Kim, Suwon-si (KR); Keuncheol Lee, Siheung-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 821 days.

(21) Appl. No.: 14/477,364

(22) Filed: Sep. 4, 2014

(65) Prior Publication Data

US 2015/0066158 A1 Mar. 5, 2015

(30) Foreign Application Priority Data

Sep. 5, 2013 (KR) .................. 10-2013-0106579
Aug. 21, 2014 (KR) .................. 10-2014-0109015

(51) Int. Cl.
*G05B 19/18* (2006.01)
*H04L 12/28* (2006.01)
*G05B 15/02* (2006.01)

(52) U.S. Cl.
CPC ............ *H04L 12/283* (2013.01); *G05B 15/02* (2013.01); *H04L 12/2829* (2013.01); *G05B 2219/2642* (2013.01)

(58) Field of Classification Search
CPC .................................................... H04L 12/283
See application file for complete search history.

(56) References Cited

U.S. PATENT DOCUMENTS 5,763,371 A 6/1998 Debska-Chwaja et al.
6,377,858 B1* 4/2002 Koeppe .................. G05B 15/02
                                                          700/12

(Continued)

FOREIGN PATENT DOCUMENTS

CN    1393092 A    1/2003
CN    1795465 A    6/2006

(Continued)

OTHER PUBLICATIONS

Jacqui Cheng, "A thermostat that learns? Three months with the Nest", Aug. 2, 2012, retrieved from https://arstechnica.com/gadgets/2012/08/a-thermostat-that-learns-three-months-with-the-nest/ on Mar. 3, 2017.*

(Continued)

*Primary Examiner* — Philip Wang
(74) *Attorney, Agent, or Firm* — Jefferson IP Law, LLP

(57) ABSTRACT

A method of controlling another device by a gateway device is provided. The method includes recording, if user operation information for an operation of a device is received from an user device, device state information received from a device group during a recording period, determining device state information recorded a predetermined number of times for a predetermined time period as common device state information, and generating, if device state information received from the device group matches the common device state information, a request for executing the operation corresponding to the user operation information to the device.

28 Claims, 14 Drawing Sheets

(56) References Cited

U.S. PATENT DOCUMENTS

| | | | |
|---|---|---|---|
| 7,647,131 B1* | 1/2010 | Sadowski | G05B 23/0297 700/108 |
| 2002/0180579 A1 | 12/2002 | Nagaoka et al. | |
| 2007/0011195 A1* | 1/2007 | Kutsumi | G06Q 30/02 |
| 2007/0073870 A1* | 3/2007 | Park | G06F 3/0219 709/224 |
| 2010/0248639 A1* | 9/2010 | Ryu | H04L 12/2825 455/67.11 |
| 2010/0283573 A1 | 11/2010 | Yum et al. | |
| 2011/0045809 A1 | 2/2011 | Yu et al. | |
| 2011/0106279 A1 | 5/2011 | Cho et al. | |
| 2011/0184586 A1 | 7/2011 | Asano et al. | |
| 2014/0080410 A1* | 3/2014 | Jung | H04B 5/00 455/41.1 |
| 2014/0278594 A1* | 9/2014 | Vivadelli | G06Q 10/02 705/5 |
| 2014/0324244 A1* | 10/2014 | Musunuri | G05B 15/02 700/299 |

FOREIGN PATENT DOCUMENTS

| | | |
|---|---|---|
| CN | 102449917 A | 5/2012 |
| CN | 102484788 A | 5/2012 |
| CN | 102668592 A | 9/2012 |
| JP | 6-319183 A | 11/1994 |
| KR | 10-2006-0066980 A | 6/2006 |

OTHER PUBLICATIONS

Ohinese Office Action dated Jul. 30, 2018, issued in Chinese Patent Application No. 201480042185.0 X.

* cited by examiner

METHOD AND APPARATUS FOR CONFIGURING AND RECOMMENDING DEVICE ACTION USING USER CONTEXT

CROSS-REFERENCE TO RELATED APPLICATION(S)

This application claims the benefit under 35 U.S.C. § 119(a) of Korean patent applications filed on Sep. 5, 2013 and Aug. 21, 2014 in the Korean Intellectual Property Office and assigned Serial numbers 10-2013-0106579 and 10-2014-0109015, respectively, the entire disclosure of each of which is hereby incorporated by reference.

TECHNICAL FIELD

The present disclosure relates to a smart home system that recognizes user context and automatically performs a process of configuring or recommending an action of each device within the smart home system based on the recognized user context.

BACKGROUND

A smart home service links various devices such as home appliances, sensors, servers, and the like, to execute actions that a user desires. Home appliances, sensors, servers, and the like included in a smart home system may transmit/receive information therebetween through gateway devices. Meanwhile, as the number of devices linked with each other in the smart home system increases, the complexity of the configurations and controls for use of the smart home service also increases.

A smart home service may include a mode service, which, if a user selects a particular mode predefined and provided by a manufacturer, executes actions of devices corresponding to the particular mode. By using the mode service, the user may control a plurality of devices to be executed together by a single input.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method in which a smart home system recognizes user context and automatically performs a process of configuring or recommending an action of each device within the smart home system based on the recognized user context.

Another aspect of the present disclosure is to provide a method in which a user newly adds or defines a mode service (rule) or manages or modifies an action of a device included in the mode service. Further, a function which can be provided through each device is recommended or a function of automatically generating a rule by detecting a device use pattern by a user is provided when the rule is defined.

Another aspect of the present disclosure is to provide the smart home service without depending on an execution input of the user.

In accordance with an aspect of the present disclosure, a method of controlling another device by a gateway device is provided. The method includes recording, if user operation information for an operation of a device is received from an user device, device state information received from a device group during a recording period, determining device state information recorded a predetermined number of times for a predetermined time period as common device state information, and generating, if device state information received from the device group matches the common device state information, a request for executing the operation corresponding to the user operation information to the device.

In accordance with another aspect of the present disclosure, a method of controlling another device by a user device is provided. The method includes recording, if a request for an operation of a device is detected, device state information received from a device group during a recording period, displaying device state information recorded a predetermined number of times for a predetermined time period, and determining, if a predetermined user input is detected, the displayed device state information as common device state information.

In accordance with another aspect of the present disclosure, a gateway device controlling another device is provided. The gateway device includes a communication unit configured to transmit and/or receive information with another device, a storage unit configured to store the information, and a controller configured to make a control to make a control to record device state information received from a device group during a recording period if user operation information for an operation of a device is received from an user device, to determine device state information recorded a predetermined number of times for a predetermined time period as common device state information, and to generate a request for executing an operation corresponding to the user operation information to the device if device state information received from the device group matches the common device state information.

In accordance with another aspect of the present disclosure, a user device controlling another device is provided. The user device includes a communication unit configured to transmit and/or receive information with another device, a storage unit configured to store the information, and a controller configured to make a control to make a control to record device state information received from a device group during a recording period if the input unit detects a request for an operation of a device, and the display unit to display device state information recorded a predetermined number of times for a predetermined time period, and to determine the displayed device state information as common device state information if the input unit detects a predetermined user input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
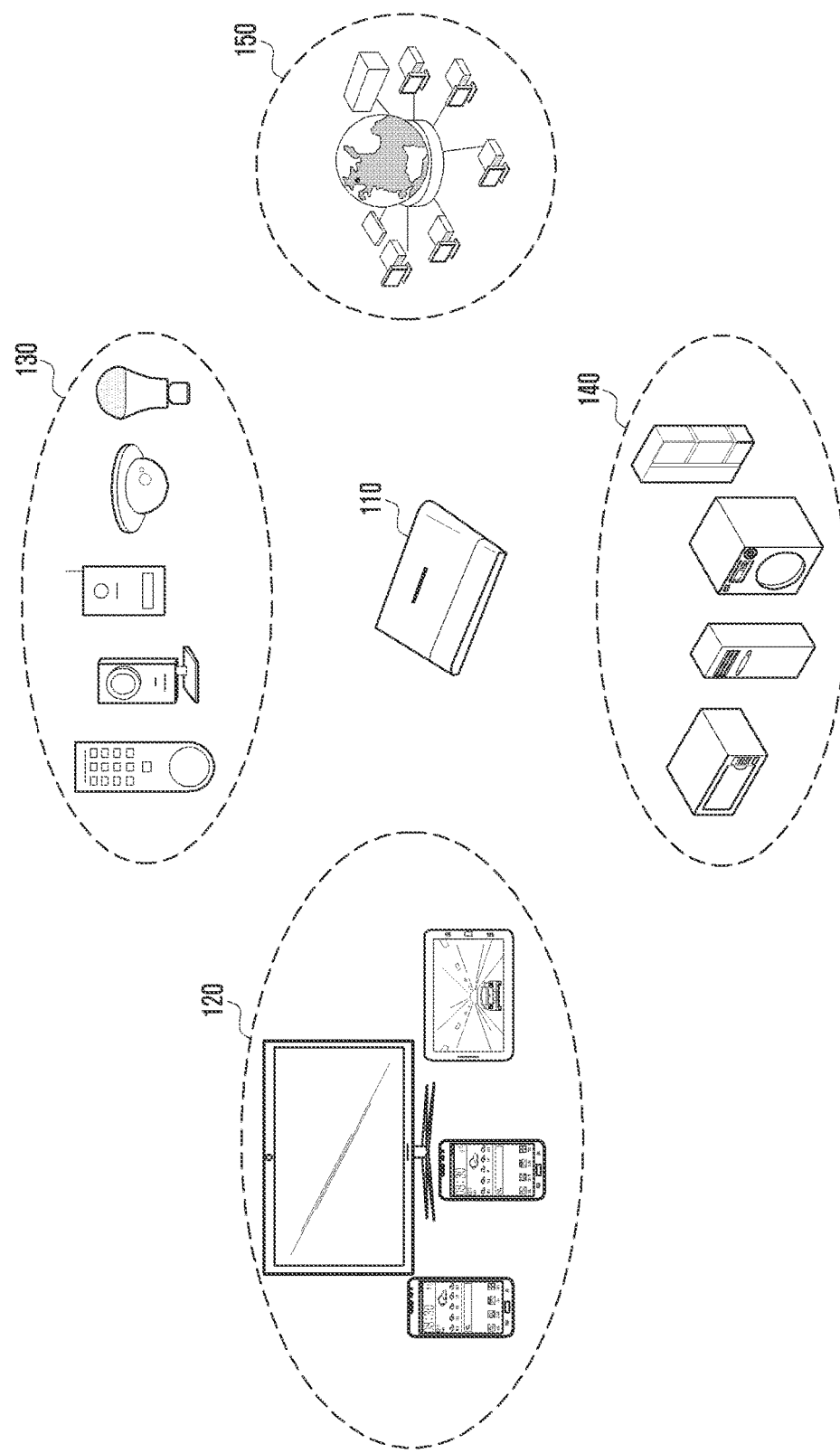
FIG. 1 is a configuration of a smart home system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the biographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the specification and claims, the term "comprise" shall not mean excluding other component elements or operations. The singular noun shall cover plural nouns unless otherwise noted. For example, "a user action" or "a state" may denote a plurality of user actions or a plurality of states. The suffix "unit" used to indicate a component in the description below has been introduced or used interchangeably only for the purpose of description of the disclosure and thus does not provide a unique meaning or a function distinguished from each other. In the specification and claims, the terms "first, second, third, etc." are used to distinguish similar elements, and are not necessarily used to describe elements in sequence or in chronological order. In the specification and claims, "first, second, and third" are not used as exclusive meanings from each other. For example, a device included in "a first device group" may be included in "a third device group".

In the specification and claims, the rule may refer to a relationship between a condition and an action triggered by the condition and is determined in consideration of a history of state information. The rule may be interchangeable with a mode service. In the specification and claims, a condition may refer to a specific state or a state change of a device or devices included in a smart home system. In the specification and claims, an action may refer to a user operation for a device or devices included in the smart home system.

The rule may be expressed as shown in Table 1. As shown in Table 1, the condition may include states of one or more devices and the action may include actions of one or more devices.

TABLE 1

| Rule | Condition | | | Action | | |
|---|---|---|---|---|---|---|
| Name | Device 1 | Device 2 | . . . | Device 1 | Device 2 | . . . |
| Icon | State | State | . . . | Action | Action | . . . |

The rule may have a unique name and icon defined by a user or recommended by the smart home system. When the rule includes the condition and action, each of the condition and the action may have a unique name and icon. The name of the rule may correspond to, for example, Market, Rainy, Away, or Sleep. The name of the condition may correspond to, for example, Near Field Communication (NFC), Door, Date & Time, Weather, Temperature, Humidity, or Light in living room. The name of the action may correspond to, for example, one of Light, Security, and Air Conditioner. The device may be classified into, for example, a home appliance/lighting device and other devices according to a device type. The rule may also include information on the device type.

The following sentences express the rule including the action (if clause) and the action (then clause).

If the present time is 10:00~21:00 and it rains, then a light in a living room is turned off If Tom goes away and no motion is detected in Tom's room for five minutes, then the light in Tom's room is turned off If the temperature is 30 degrees Celsius or higher in a place where Jane is located, then the air conditioner is turned on. If someone goes away after nine o'clock, then a camera and a sensor are activated. If laundry by a washing machine is finished, then this status is informed using a popup and a Light Emitting Diode (LED) light. If an approach of an NFC tag belonging to Alice is detected, then the computer in Alice's room is turned on and a word program is executed. If an amount of electricity consumed yesterday is two times larger than an amount of electricity consumed two days ago, then an alert message is displayed on Margie's terminal.

The detection of the condition and the action by a gateway may refer to the detection by a sensor or an input unit included in the gateway or may refer to reception of sensing information or input information of another device by the gateway.

Specifically, the condition may indicate external environment information measured by a sensor of the smart home system or a state or a state change of a device or devices included in the smart home system. In the specification and claims, "condition" may be used interchangeably with "user context" or "device state". Table 2 shows examples of the condition.

TABLE 2

| External condition | | | | Home appliance/lighting device | | | | | |
|---|---|---|---|---|---|---|---|---|---|
| Temperature | Weather | Power rate | Time | Refrigerator | Air conditioner | Washing machine | Drier | Oven | TV |
| Warm | Sunny | Expensive | Dawn | Turned on | Turned on | Turned on | Turned on | Turned on | Turned on |
| Normal | Cloudy | Normal | Morning | Turned off | Turned off | Turned off | Turned off | Turned off | Turned off |
| Cold | Rainy snow | Cheap | Lunch time | Open refrigerator | High temperature | Laundry completion | Dry completion | Cooking completion | Channel 1 Channel 2 |
| | | | Afternoon | Closed refrigerator | Normal temperature | | | | |
| | | | Evening | Open freezer | Low temperature | | | | |
| | | | Night | Closed freezer | | | | | |

| External condition | | | | Home appliance/lighting device | | Other devices | | | |
|---|---|---|---|---|---|---|---|---|---|
| Temperature | Weather | Power rate | Time | LED | Switch | Door lock | Motion detector | IP camera | Thermostat |
| Warm | Sunny | Expensive | Dawn | Turned on | Turned on | Open door | Turned on | Turned on | Turned on |
| Normal | Cloudy | Normal | Morning | Turned off | Turned off | Closed door | Turned off | Turned off | Turned off |
| Cold | Rainy snow | Cheap | Lunch time | Bright | | | Action detection | Action detection Sound detection | High temperature Normal temperature Low temperature |
| | | | Afternoon | Normal | | | | | |
| | | | Evening | Dark | | | | | |
| | | | Night | | | | | | |

Referring to the external condition of Table 2, the time may correspond to a state of one of dawn, morning, lunch time, afternoon, evening, and night. In the home appliance/lighting device of Table 2, the television (TV) may correspond to a state of one of turned on, turned off, channel 1 display, and channel 2 display. In other devices of Table 2, the thermostat may correspond to a state of one of high temperature, normal temperature, and low temperature. Information on the condition detected from each device may be transmitted to a gateway device.

Specifically, the action indicates an action of a device or devices included in the smart home system. In the specification and claims, the "action" may be used interchangeably with "user operation". Table 3 shows examples of the action.

TABLE 3

| Home appliance/lighting device | | | | | | | Other devices | | | | |
|---|---|---|---|---|---|---|---|---|---|---|---|
| Refrigerator | Air condition | Washing machine | Drier | Oven | TV | LED | Switch | Door lock | Motion detector | IP camera | Thermostat |
| Open refrigerator | Turn on power | Turn on power | Turn on power | Turn on power | Turn on power | Turn on power | Turn on power | Open door | Detect motion | Detect motion | Turn on power |
| Close refrigerator | Turn off power | Turn off power | Turn off power | Turn off power | Turn off power | Turn off power | Turn off power | Lock door | Detect no motion | Detect sound | Turn off power |
| Open freezer | Raise temperature | | | | | Brighten | | | | Transmit image | Raise temperature |

TABLE 3-continued

| | Home appliance/lighting device | | | | | | | Other devices | | | |
|---|---|---|---|---|---|---|---|---|---|---|---|
| Refrigerator | Air condition | Washing machine | Drier | Oven | TV | LED | Switch | Door lock | Motion detector | IP camera | Thermostat |
| Close freezer Lower temperature Raise temperature | Lower temperature | | | | | Darken | | | | | Lower temperature |

In the home appliance/lighting device, the LED may detect an action corresponding to one of the actions of turning on power, turning off power, lightening a screen, and darkening a screen. In other devices, the motion detector may detect an action corresponding to one of motion detection and no motion detection. Information on the action detected from each device may be transmitted to a gateway device. Table 3 shows only an example of the action, and the user may determine whether to repeat the action, the number of repetitions, and a time interval between repetitions by editing the action. Information on the action detected from each device may be transmitted to a gateway device.

Hereinafter, various embodiments of the present disclosure will be described with reference to accompanying drawings.

FIG. 1 illustrates a configuration of a smart home system according to an embodiment of the present disclosure.

Referring to FIG. 1, the smart home system may include a gateway 110, a User Equipment (UE) 120, an associated device 130, a smart appliance 140, and a remote server 150, but is not limited thereto.

The gateway 110 may be also called a gateway device and may communicate with the UE 120, the associated device 130, the smart appliance 140, and/or the remote server 150. The gateway 110 may store data received from the UE 120, the associated device 130, the smart appliance 140, and/or the remote server 150 or data required for controlling the UE 120, the associated device 130, the smart appliance 140, and/or the remote server 150. The gateway 110 may include one or more displays (touch screens) which may display a User Interface (UI). According to an embodiment of the present disclosure, the gateway 110 may perform all or some of the functions of the UE 120, the associated device 130, or the smart appliance 140. In other words, a smart phone, a wearable device, a tablet Personal Computer (PC), a vacuum, a refrigerator, a TV, a thermostat, and the like may serve as the gateway 110.

The UE 120 is an electronic device configured to execute an application driven in an Operating System (OS) or display contents. The UE 120 may include a display (touch screen) for displaying a UI, a communication unit for communicating with an external device, a storage unit for storing data, an input unit for receiving a user's input, or a controller for controlling the performance of each action. The UE 120 may include, for example, a tablet PC, a Portable Multimedia Player (PMP), a Personal Digital Assistant (PDA), a smart phone, a mobile phone, a digital frame, a wearable device, and the like. The wearable device is an electronic device worn on a user's body, and may have the form of, for example, glasses, a watch, a bracelet, clothing, sports equipment, a medical machine, and the like. The wearable device may have the form in which it is attached to the skin or transplanted into a human body.

The associated device 130 may include a PhotoVoltaic (PV), an Energy Storage System (ESS), a door lock, an Internet Protocol (IP) camera, a door camera, and the like. The associated device 130 may include sensors which sense earth magnetism, atmospheric pressure, user motion, user proximity, user position, window, temperature, humidity, illumination, gravity, and the like.

The smart appliance 140 may include a television, a refrigerator, a washing machine, an air conditioner, an oven, a dish washer, or a robot vacuum.

Referring to FIG. 1, the UE 120, the associated device 130, the smart appliance 140 may be collectively called a "device". In other words, in the specification and claims, the device may defined as a device of which a state may be monitored or of which an action may be controlled by the user through a gateway (GW), a terminal, and/or a server. Meanwhile, others which have not been mentioned above may correspond to the device in addition to the above listed devices as the UE 120, the associated device 130, and the smart appliance 140.

The remote server 150 may control device actions via a remote access. Although, a device action controlled by the gateway or the device is described in the specification, the remote server 150 may also control the device action. The remote server 150 may include a display (touch screen) for displaying a UI, a communication unit for communicating with an external device, a storage unit for storing data, an input unit for receiving a user input, or a controller for controlling the performance of other units.

Figure 2:
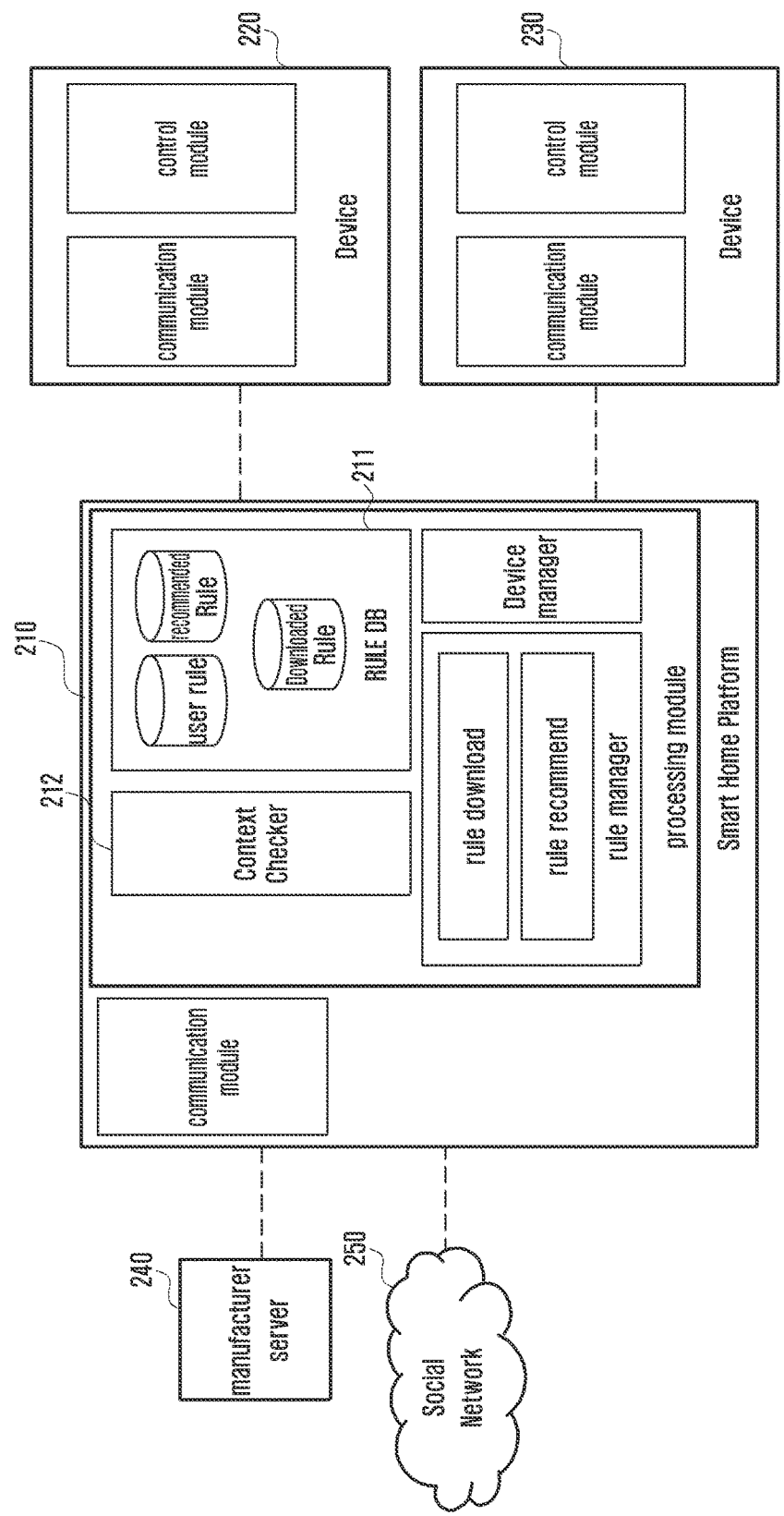
FIG. 2 illustrates a configuration of a smart home system according to another embodiment of the present disclosure.

FIG. 2 illustrates a configuration of a smart home system according to another embodiment of the present disclosure.

Referring to FIG. 2, a smart home platform 210 may include a rule DataBase (DB) 211. The smart home platform 210 may include a context checker module 212 for executing a proper rule by comparing state information of a device which the smart home platform 210 monitors and user context information defined in the rule DB 211. The smart home platform 210 may correspond to the gateway 110 of FIG. 1. The smart home platform 210 may be connected to other devices 220 and 230, a manufacturer server 240, or a social network 250. The manufacturer server 240 or the social network 250 may include the remote server 150 of FIG. 1.

Figure 3:
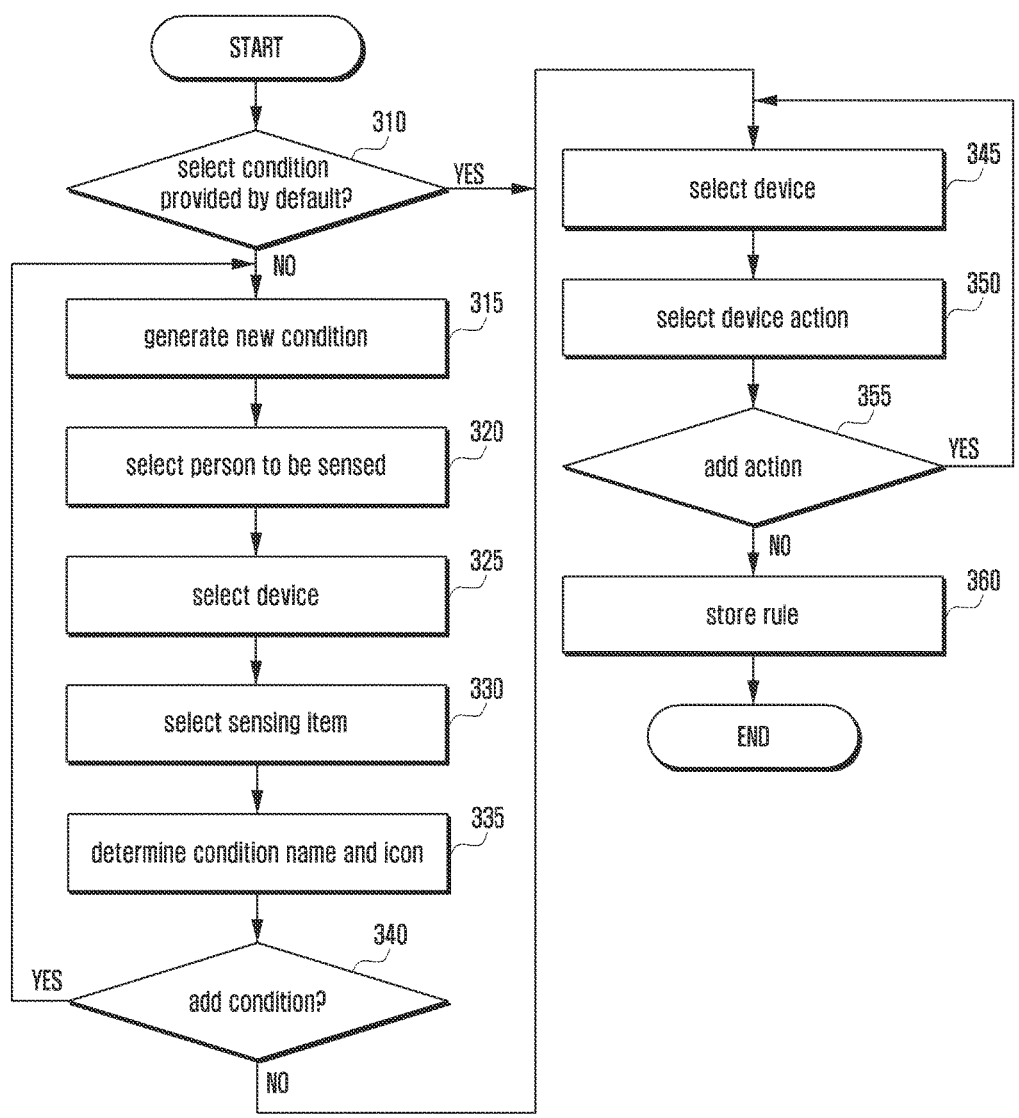
FIG. 3 is a flowchart illustrating a process of receiving a condition and an action and generating a rule according to an embodiment of the present disclosure.

FIG. 3 is a flowchart illustrating a process of receiving a condition and an action and generating a rule according to an embodiment of the present disclosure.

Referring to FIG. 3, when a rule generation process starts, the gateway of the smart home system determines whether the user selects a condition provided by default in operation 310. When the user does not select the condition provided by default, the gateway generates a new condition in operation 315. The gateway may receive information required for generating the condition from the user. A process of receiving the required information may include, for example, a process of receiving selection for a person to be sensed in operation 320, a process of receiving selection for a sensing device in operation 325, a process of receiving selection for a sensing item in operation 330, and a process of receiving a name of a condition triggering the sensing or generation and/or addition of an icon in operation 335. The process of receiving the selection for the person to be sensed may include a process of receiving selection for an NFC tag corresponding to the person to be sensed. According to an embodiment of the present disclosure, when the user selects the condition provided by default, a condition input may be completed only by an input for selecting the person to be sensed. When the condition input is completed, it is determined whether there is an input for adding a new condition in operation 340.

When there is no input for adding the new condition, an action corresponding to a condition selected or generated by the user is input by the user. A process of receiving the action corresponding to the condition may include a process of selecting a device which performs the action corresponding to the condition in operation 345 and a process of selecting the action of the selected device in operation 350. When it is determined that there is no input for adding the new action in operation 355 after the action input is completed, a condition and an action input by the user are matched to generate a rule and the generated rule is stored in operation 360. Otherwise, at operation 355 when it is determined that there is input, return to operation 345. A process of storing the generated rule may include a process of receiving a name of the rule and an icon from the user and storing the received name of the rule and icon.

Figure 4:
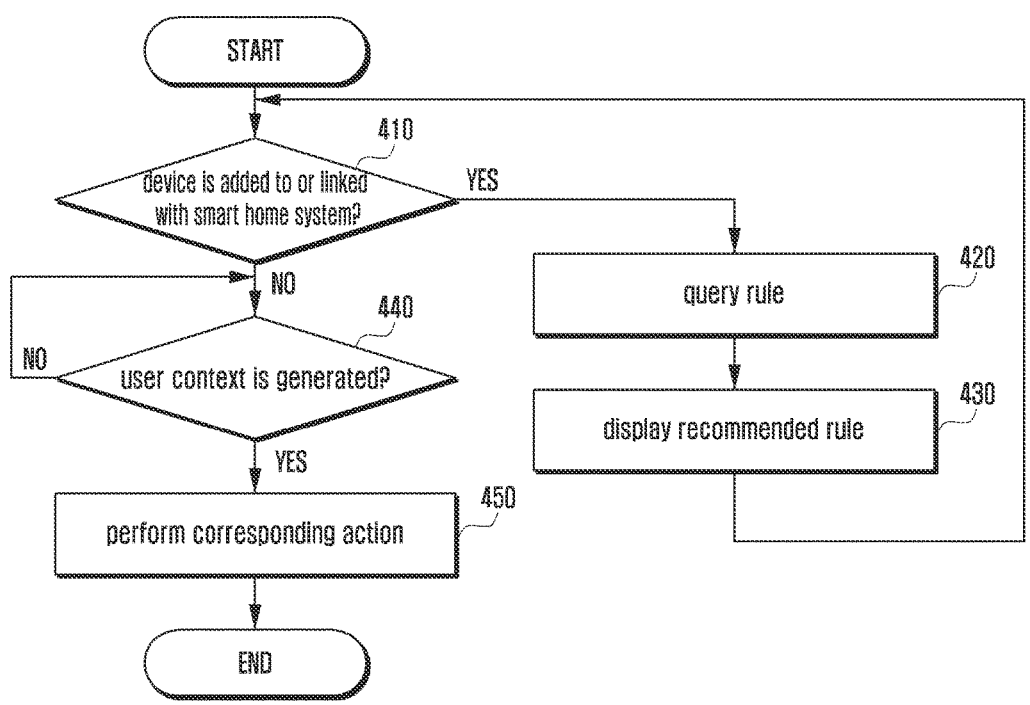
FIG. 4 is a flowchart illustrating a process of editing a rule and performing an action based on the application of the rule according to an embodiment of the present disclosure.

FIG. 4 is a flowchart illustrating a process of editing a rule and performing an action based on the application of the rule according to an embodiment of the present disclosure.

Referring to FIG. 4, in a state where the smart home service is activated, the gateway (GW) 110 may determine whether a device is added to or linked with the smart home system in operation 410. The gateway may record a rule list in which the device and the rule are matched in the form of a mapping table. The mapping table may further include information on a device type. When the gateway determines to add the device in operation 410, the gateway may query about whether the mapping table contains a device which matches the added device or a rule including information on a device type in operation 420. The mapping table may be stored in the gateway, another device, or the server. When it is determined that the device or the device type mapped between the added or linked device and the device included in a particular rule within the list through a response to the query, the gateway may display a recommendation for the corresponding particular rule to the user in operation 430. When the user selects the displayed particular rule, the selected rule is registered as a new rule corresponding to the added device.

In a state where the rule is registered, the gateway (GW) may determine whether user context included in the registered rule is generated in operation 440. The generation of the user context may be detected when one or more states shown in Table 2 are detected or state changes into one or more states shown in Table 2 are detected. When it is determined that the user context is generated, the gateway may query information included in the rule list stored in the rule DB. For example, the context checker module 212 may compare state information of the device with condition information defined in the rule DB 211. The condition information may include a particular time or date defined by the user.

When it is determined that the user context is generated, the gateway may control a device or devices within the smart home system to perform an action corresponding to the user context in operation 450.

The user may inquire about the rule list stored in the rule DB. In a state where the rule list is displayed, the user may activate or deactivate (turn on/off) each rule. Even though there is no inactive input by the user, a rule having a problem in the link with the device may be deactivated during the inquiry of the rule list. Displays of the activation or deactivation (on/off) of the rule during the inquiry of the rule list may be distinguished. The distinguished displays may correspond to, for example, different colors. During the inquiry of the rule list, the user may add, edit, or delete a condition (user context), an action (user operation), a name, or an icon for each rule.

The user may generate a new rule by inputting a condition and an action through a tool included in the gateway or the device connected to the gateway. Unlike above, the gateway may analyze a relation between the use of the device by the user and a context pattern and extract a condition and an action through a result of the analysis, so as to automatically generate a rule.

Figure 5:
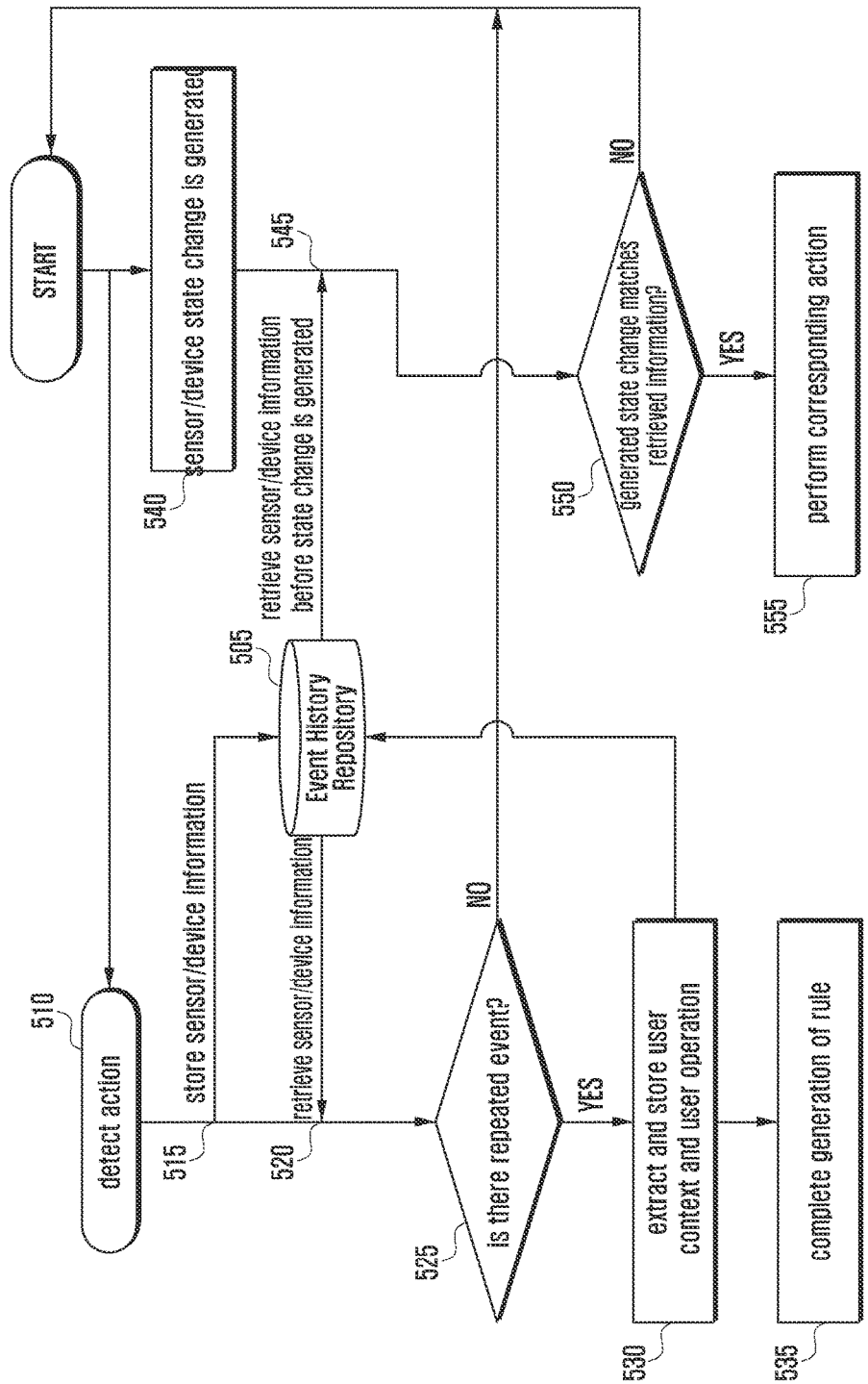
FIG. 5 is a flowchart illustrating a process of generating a rule based on the use of the device by the user and a context pattern and applying the generated rule according to an embodiment of the present disclosure.

FIG. 5 is a flowchart illustrating a process of generating a rule based on a use of a device by a user and a context pattern and applying the generated rule according to an embodiment of the present disclosure.

Referring to FIG. 5, an event may be defined as user context detected by the device and a user operation for the device. The smart home system may include an event history repository 505 for storing an event. Information on the user context and the user operation stored in the event history repository 505 may be automatically discarded after a predetermined time from the storage.

When the action of the device by the user is detected in operation 510, the smart home system may store information monitored by the smart home system during a predetermined time period before and after a time point when the action is detected in the event history repository 505 in operation 515. The action of the device may correspond to, for example, a motion in which the user opens a front door and enters from the outside. The predetermined time period before and after the detected time point may correspond to, for example, two minutes from the detected motion. The information monitored by the smart home system is information acquired from a sensor/device included in the smart home system. The information monitored by the smart home system may include, for example, a user operation of turning on the light, a user operation of turning on the TV, and user context of entering the kitchen.

The smart home system may periodically retrieve sensor/device information (event information) stored in the event history repository 505 in operation 520 to generate a rule by a user input or whenever an event is detected and may determine whether there is an event repeated in each time period based on the detected event information in operation 525. When there is the repeated event, the smart home system may extract user context and user operation included in the event and store the extracted user context and user operation in the event history repository 505 in operation 530. By the storage, a rule generation process including a particular user operation triggered by particular user context may be completed in operation 535.

According to another embodiment of the present disclosure, when there is a condition(s) repeated for a particular action(s) by the predetermined number of times during a process of storing repeated event information, the event history repository 505 may generate a rule including the repeated condition(s) and the particular action(s) and recommend the generated rule to the user.

When the smart home system detects a state change of the sensor/device in operation 540, the smart home system may retrieve the sensor/device information (event information) stored in the event history repository 505 before the detection of the state change of the sensor/device in operation 545. The smart home system determines whether user context included in the event information acquired by the search matches the detected state change in operation 550 and execute an action corresponding to the user context when the user context matches the detected state change in operation 555.

Figure 6:
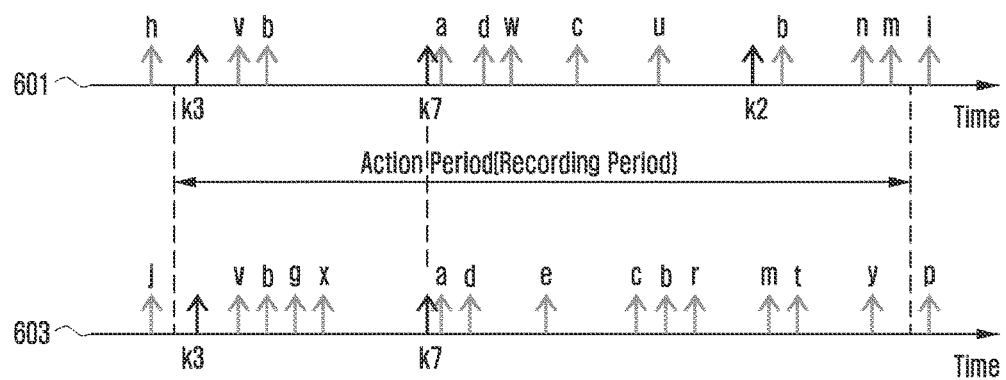
FIG. 6 illustrates action periods according to an embodiment of the present disclosure.

FIG. 6 illustrates action periods according to an embodiment of the present disclosure.

Referring to FIG. 6, action periods during which k7 (condition) is detected and events (user context and user operation) which are detected during the action period are illustrated. The action period may behave the same meaning of a recording period. It may be noted through FIG. 6 that an action period corresponding to k7 (condition) starts before a detection time point of k7 and ends after the detection time point of k7. Alternatively, the action period may start or end at the detection time point of the condition. The action period is a preset time period and may correspond to, for example, one of thirty seconds, two and a half minutes, two hours, and forty eight hours. The action period (recording period) may be determined in consideration of time generally spent while the user performs an associated action (for example, time spent while the user moves to a farthest room from an entrance of a house) before and after a particular action of the user (for example, an action of opening an entrance door of the house from the outside).

K2, k3, and k7 refer to state changes (user context) of the device and a, b, c, and d refer to user operations for the device. At timeline 601 there is an event E1={a, b, c, d, m, n, u, w, k2, k3, k7} detected during the action periods. At timeline 603 there is an event E2={a, b, c, d, e, m, r, t, y, k3, k7} detected during the action periods. E1 and E2 are expressed without regard to time points when the user context and the user operation are generated. Alternatively, the user context and the user operation may be specified in consideration of generated sequences.

Figure 7:
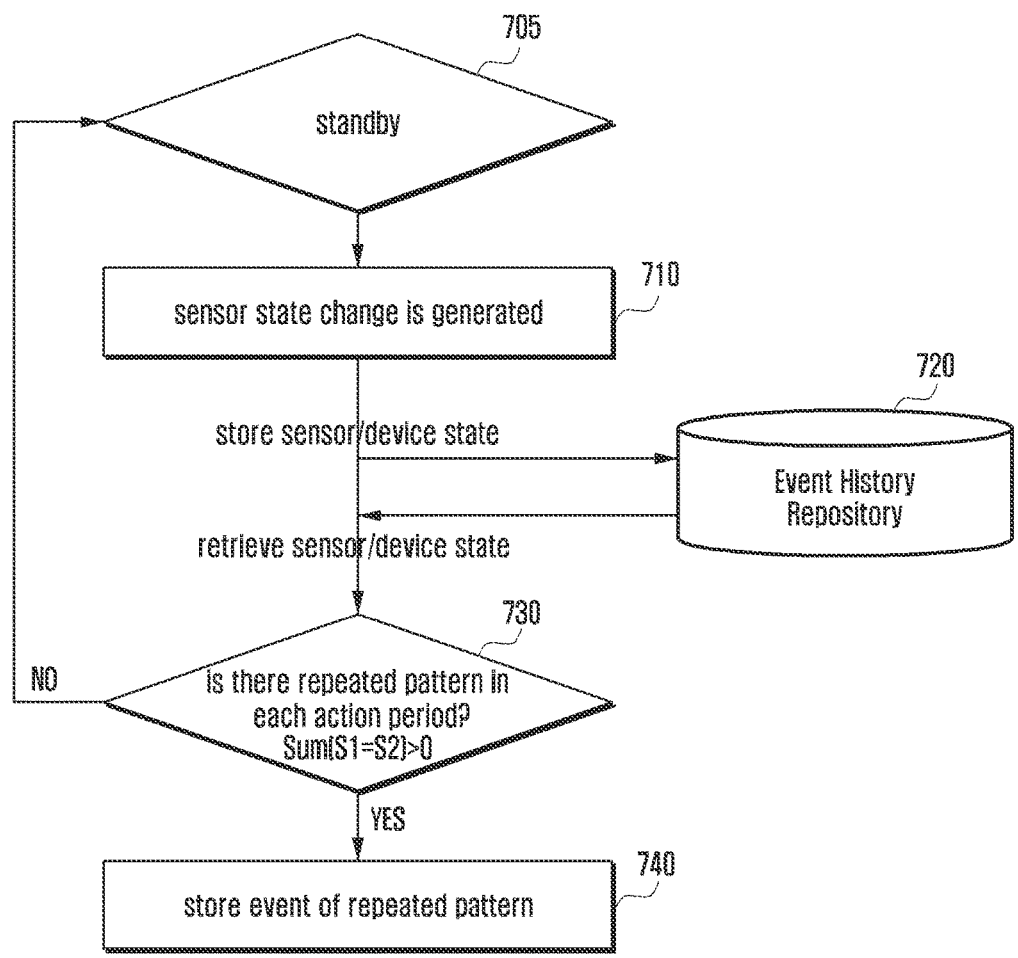
FIG. 7 is a flowchart illustrating a process of extracting an event during an action period according to an embodiment of the present disclosure.

FIG. 7 is a flowchart illustrating a process of extracting an event during an action period according to an embodiment of the present disclosure.

Referring to FIG. 7, when the smart home system detects a state change of the device (for example, a sensor) in operation 710, the smart home system may store information monitored by the smart home system during a predetermined time period before and after a detection time point of the state change in operation event history repository 720. While the storage based on the user operation detection is illustrated in FIG. 5, the storage based on the state change detection is illustrated in FIG. 7. The state change of the device may correspond to, for example, a change in the present time from dawn (05:00~08:00) to morning (08:00~12:00). A detailed time corresponding to the dawn or the morning may be changed by the user. The information monitored by the smart home system may include, for example, detection of a user's motion in a bedroom, detection of a user's motion in a living room, and a user operation of turning on a light in a living room.

The smart home system may periodically retrieve event information stored in the event history repository 720 to generate a rule by a user input or whenever an event is detected. The smart home system may determine whether there is an event of a pattern repeated in each action period based on the retrieved event information in operation 730. When there is no repeated pattern at operation 730, the smart home system proceeds to a stand by state 705, waiting for a state change 710.

A process of determining whether there is the event of the pattern repeated in each action period based on the retrieved event information will be described with reference to FIG. 6. As illustrated in FIG. 6, a past event may be divided into action periods based on time.

In a process of extracting the user operation in each action period, it is assumed that the user operation is S1={a, b, c, d, m, n, u, w} as shown at 601 and the user operation is S2={a, b, c, d, e, m, r, t, y} as shown at 603. In this case, an intersection S={a, b, c, d, m} between S1 and S2 may be determined as the extracted user operation. The extracted user operation may be called a common user operation.

In a process of extracting user context (a device state) in each action period, it is assumed that user context is K1={k2, k3, k7} as shown at 601 and user context is K2={k3, k2} as shown at 603. In this case, an intersection K={k2, k3} between K1 and K2 corresponds to the extracted user context. The extracted user content may be called common user context or a common device stat.

FIG. 6 illustrates only the comparison between two action periods, but the present disclosure is not limited and a common event (user operation and user context) may be extracted through a comparison of two or more action periods.

The smart home system determines whether there is an event of a repeated pattern in operation 730. When the smart home system determines that there is an event of a repeated pattern, the smart home system may extract user context and user operation included in the event and store the extracted user context and user operation in an event history repository 720 in operation 740.

In the above various embodiments, the condition and the action are distinguished according to the user context detected by the device or the user operation for the device. However, a reference for distinguishing the condition and the action is not limited thereto. For example, when a particular user context or a particular user operation is detected, another user context or user operation detected before the particular user context or the particular user operation is detected may be defined as the condition, and another user context or user operation detected after the particular user context or the particular user operation is detected may be defined as the action.

Figure 8:
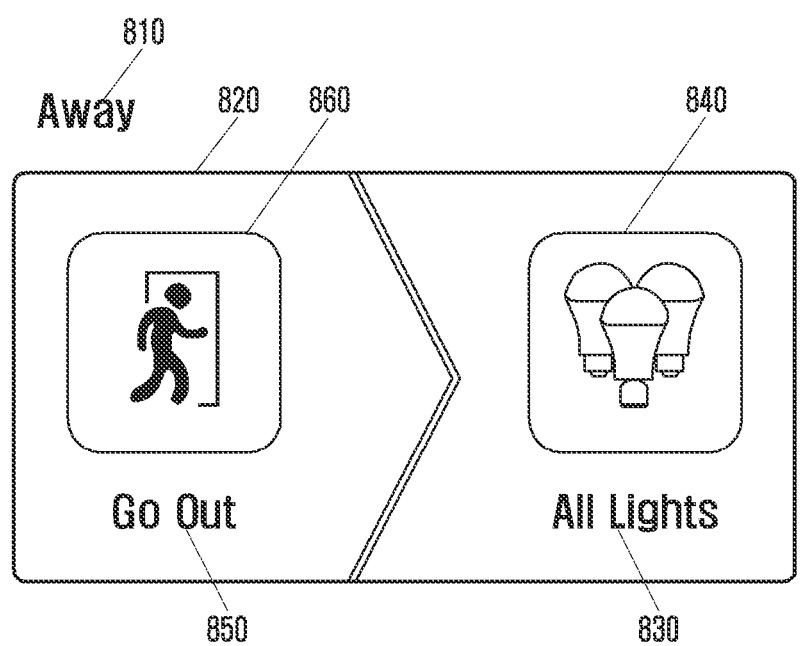
FIG. 8 illustrates a name and an icon according to an embodiment of the present disclosure.

FIG. 8 illustrates a name and an icon according to an embodiment of the present disclosure.

Referring to FIG. 8, a user may inquire about a rule list through the device of the smart home system or the gateway. At this time, when the rule includes a name or an icon, the name or the icon may be displayed on the device and/or the gateway. For example, a name 810 and an icon 820 are illustrated. A condition and an action included in the rule also may have a name and an icon. Examples of a name 830 of the action, an icon 840 of the action, a name 850 of the condition, and an icon 860 of the condition are illustrated.

Figure 9:
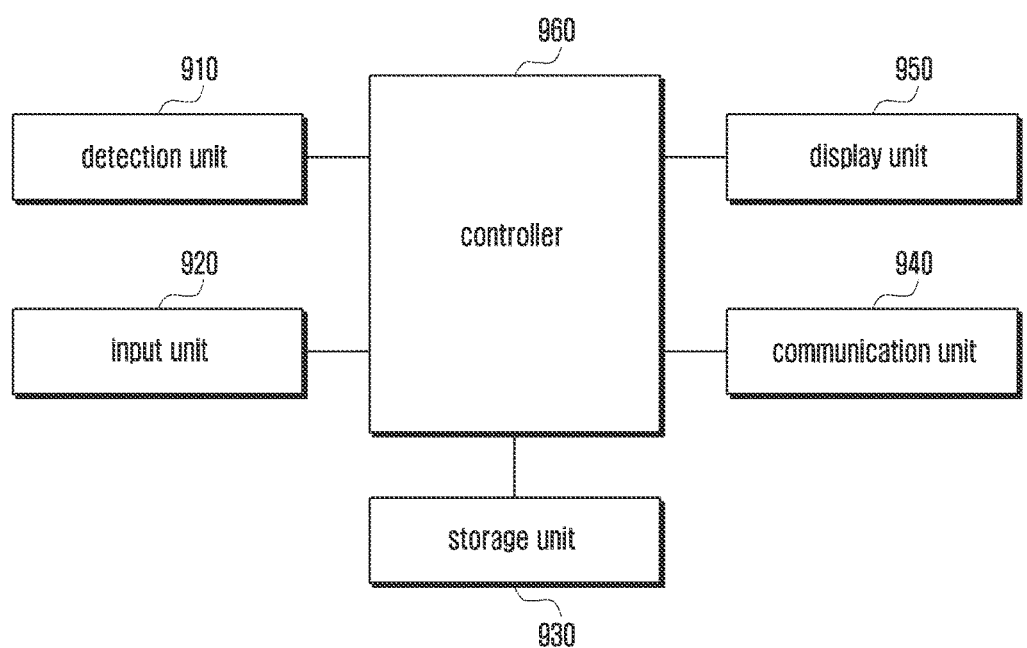
FIG. 9 is a block diagram of a gateway device according to an embodiment of the present disclosure.

FIG. 9 is a block diagram of the gateway device according to an embodiment of the present disclosure.

Referring to FIG. 9, a gateway device (gateway) may include a detection unit 910, an input unit 920, a storage unit 930, a communication unit 940, and a display unit 950, but is not limited thereto.

The detection unit 910 may include one or more sensors for detecting a user context or a user operation. For example, the sensors may include a geomagnetic sensor, a temperature sensor, an atmospheric pressure sensor, a proximity sensor, an illumination sensor, a Global Positioning System (GPS), an acceleration sensor, an angular speed sensor, a speed sensor, a gravity sensor, a slope sensor, a gyro sensor, a gas sensor, a camera, a microphone, and the like.

The input unit 920 may transmit signals input by the user which are related to controls of functions of the gateway and configurations of various functions to a controller 960. Further, input unit 920 may be combined with the display unit 950 to implement a touch screen or may be formed by a general keypad. In addition, the input unit 920 may include a function key, a soft key, and the like.

The storage unit 930 may store monitoring information collected by the gateway or information input by the user. The monitoring information may include information on user context detected by devices (including the gateway) of the smart home system or information on user operation for the devices. According to another embodiment of the present disclosure, the storage unit 930 may be included in a separated server.

The communication unit 940 may transmit/receive monitoring information or information required for controlling another device through communication with another device or a server. The display unit 950 may display information on a rule list or a recommended rule through a user interface.

The controller 960 controls general states and actions of components included in the gateway. The controller 960 may make a control to store the monitoring information received through the detection unit 910 or the communication unit 940 in the storage unit 930. The controller 960 controls the display unit 950 to display information and controls another unit to perform a function corresponding to a user input received through the input unit 920, so as to execute a process according to various embodiments of the present disclosure.

Although the detection unit 910, the input unit 920, the storage unit 930, the communication unit 940, the display unit 950, and the controller 960 are illustrated as separated blocks and the blocks perform different functions in FIG. 9, it is only for the technical convenience and the functions do not have to be separated.

Figure 10:
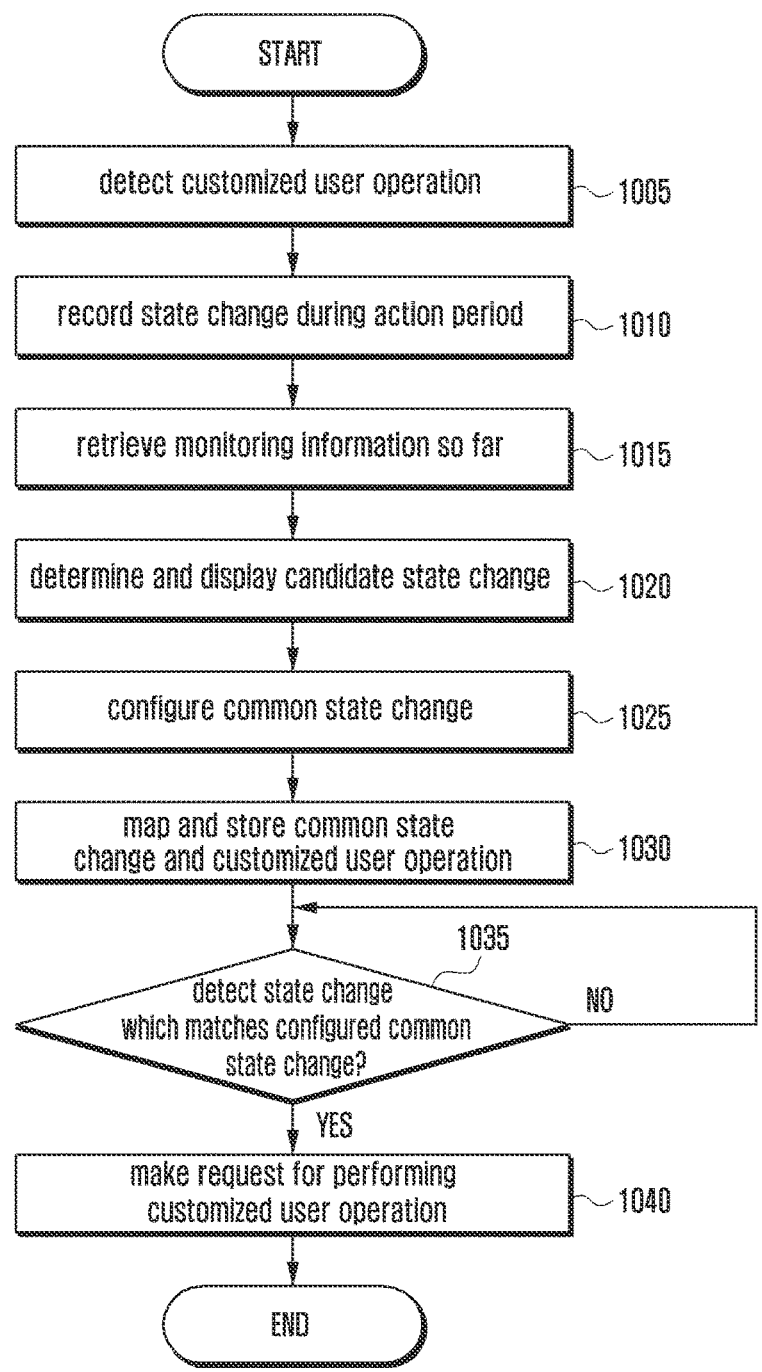
FIG. 10 is a flowchart illustrating a process of generating a rule and executing the generated rule according to an embodiment of the present disclosure.

FIG. 10 is a flowchart illustrating a process of generating a rule and executing the generated rule according to an embodiment of the present disclosure.

Referring to FIG. 10, the gateway device of the smart home system may detect a user operation customized for a first device group to which a recording period is assigned by the user from among devices included in the smart home system in operation 1005. A device group may include only one device. The customized user operation may include one or more actions shown in Table 3. The customized user operation may correspond to, for example, an action of turning on the TV and air conditioner. The recording period is a time period in which monitoring information is recorded to automatically generate a rule. The gateway device may record state changes of the devices included in the smart home system during the recording period in operation 1010.

When the gateway device periodically detects a user input or whenever the gateway device detects an event to automatically generate a rule, the gateway device may retrieve the recorded monitoring information (state changes) so far in operation 1015. Periodically retrieving the monitoring information may be performed, for example, every twelve hours. Event detection may correspond to no motion detection within the home for thirty minutes or longer.

When there a state change having a repeated pattern for the retrieved monitoring information (state changes), the gateway device determines the corresponding state changes as candidate state changes and displays the candidate state changes to allow the user to see the candidate state changes in operation 1020. The candidate state changes may include, for example, the arrival of 10 a.m. on Saturday.

A common state change may be a state change which triggers a user operation customized after the rule is registered. When there is a user input for configuring the candidate state change as the common state change, the gateway device configures the candidate state change as the common state change in operation 1025. According to another embodiment of the present disclosure, even when there is no user input for a predetermined time, the gateway may configure the candidate state change as the common state change. Unlike the above, when there is no user input for a predetermined time, the gateway may end the display of the candidate state change without configuring the common state change.

The gateway device maps and stores the configured common state change and the customized user operation in operation 1030. The rule is generated through the above process.

After the rule is generated, the gateway device may determine whether a state change which matches the configured common state change is detected in operation 1035. When the gateway device determines that the state change which matches the configured common state change is detected, the gateway device may make a request for the customized user operation to the first device group without the user input in operation 1040.

Through the process of FIG. 10, the gateway collects context information when an action routinely input by the user is performed and performs the action which was performed by the user input without the user input when the context is the same as the collected context information. For example, the gateway device which learns a pattern in which the user turns on the TV and the air conditioner at 10 a.m. on Saturday may make a control to automatically turn on the TV and the air conditioner without a user input.

Figure 11:
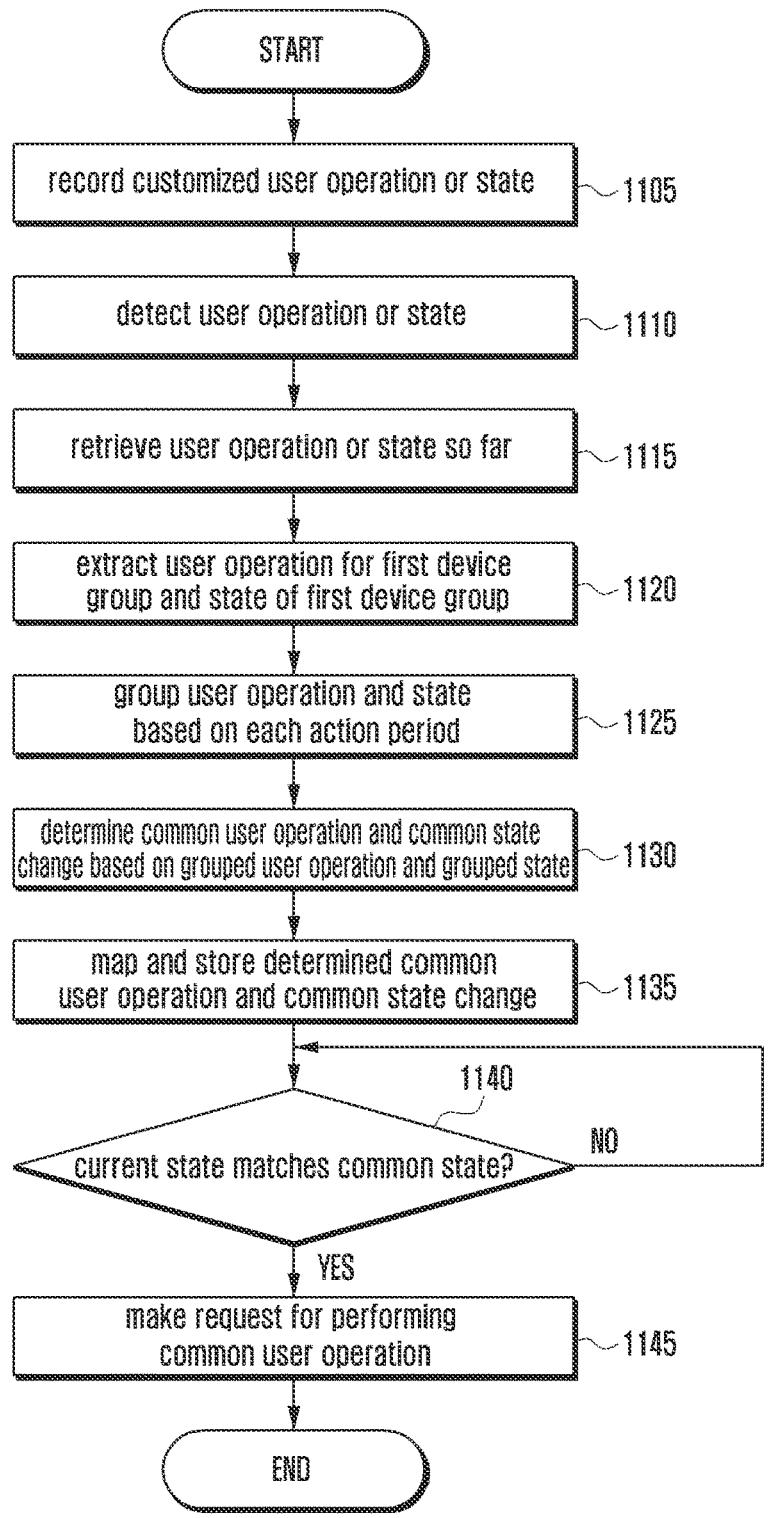
FIG. 11 is a flowchart illustrating a process of generating a rule and executing the generated rule according to another embodiment of the present disclosure.

FIG. 11 is a flowchart illustrating a process of generating a rule and executing the generated rule according to another embodiment of the present disclosure.

Referring to FIG. 11, the gateway device of the smart home system may detect user operations for devices included in the smart home system or states of the devices in operation 1105. The user operation may include one or more actions shown in Table 3. The state may include one or more states shown in Table 2. The gateway device may record the detected user operation or state in operation 1110. Recording the state may correspond to recording states of predetermined device or devices rather than recording states of all devices included in the smart home system.

When the gateway device periodically detects a user input or whenever the gateway device detects an event to automatically generate a rule, the gateway device may retrieve the recorded user operations and states so far in operation 1115.

The gateway device may extract a user operation for a first device group and a state of the first device group from among the retrieved user operations and states in operation 1120. The first device group may refer to one or more devices to which recording periods are assigned by the user among the devices included in the smart home system. The recording period is a time period assigned for each first device group to group the user operation and state. The recording period may start at a time point when the first device group detects the user operation or state or before the time point and end at the time point when the first device group detects the user operation or state or after the time point.

The gateway device may group each of the user operation and state for each recording period with respect to each of the extracted user operation or the extracted state in operation 1125. When there is a grouped user operation or a group state having a repeated pattern, the gateway device may determine the corresponding user operation or state as a common user operation and a common state in operation 1130. The repeated pattern may be defined as the predetermined number of repetitions (for example, five times). The predetermined number of repetitions may be differently defined according to the grouped user operation or the grouped state. According to another embodiment of the present disclosure, similar to operation 1020 of FIG. 10, in order to determine the user operation and state as the common user operation and the common state, the candidate user operation and the candidate state are displayed to receive a user selection input.

The gateway device may map and store the determined common user operation and common state in operation 1135. The rule is generated through the above process.

After the rule is generated, the gateway device may determine whether a current state of a predetermined device or devices of the devices included in the smart home system matches the stored common state in operation 1140. The predetermined device or devices may be the same as the device or devices of which the user operation or state is detected in operation 1105 or may be included in the device or devices. When it is determined that the current state of the predetermined device or devices matches the stored common state, the gateway device may make a request for the common user operation to the first device group without the user input in operation 1145.

Through the process of FIG. 11, the gateway device collects context information when a routinely repeated action is performed by the user and performs the repeated action without the user input when the context same as the collected context information is detected.

Figure 12:
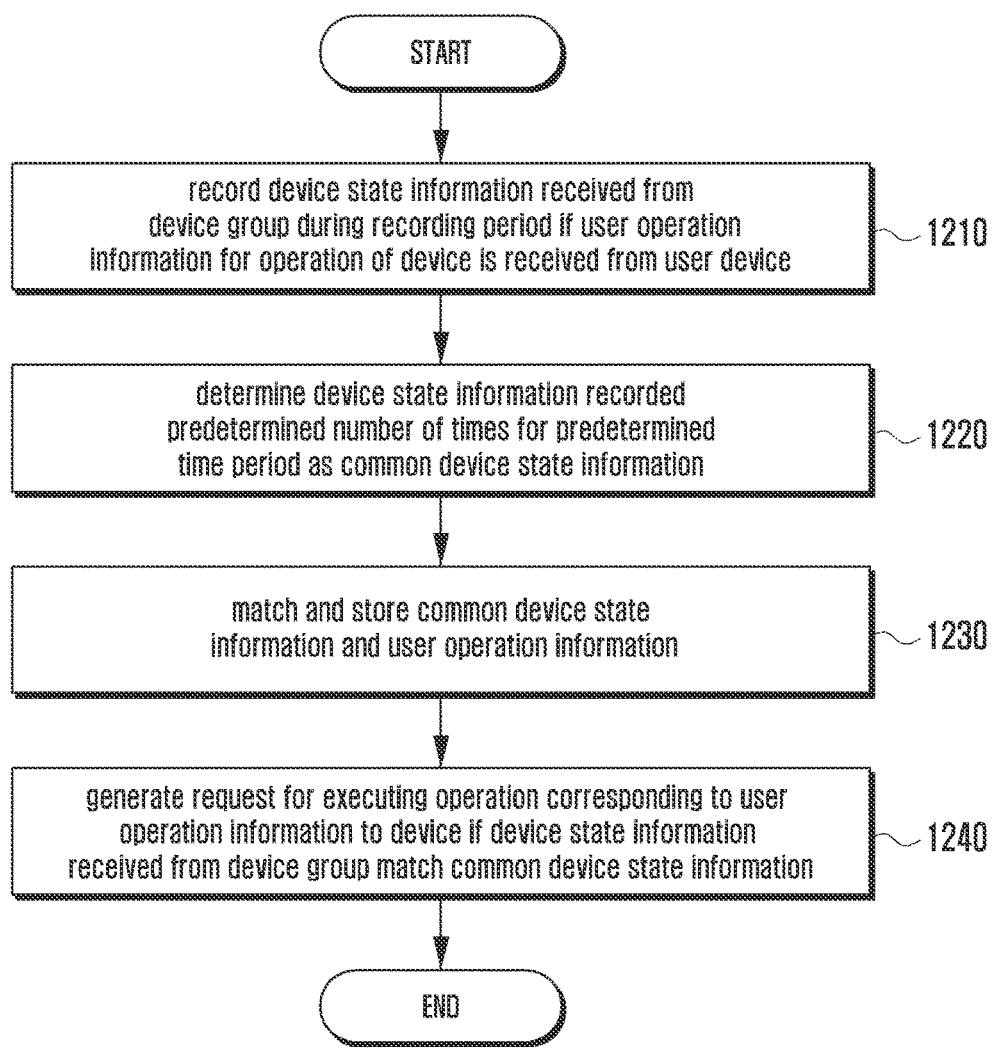
FIG. 12 is a flowchart illustrating a process in which a gateway controls another device according to an embodiment of the present disclosure.

FIG. 12 is a flowchart illustrating a process in which the gateway controls another device to an embodiment of the present disclosure.

Referring to FIG. 12, if the gateway device of the smart home system receives user operation information for an operation of a device from a user device, the gateway device records device state information received from a device group during a recording period in operation 1210. The device group may include one or more devices. The user device, for example, a smart phone, may detect a request for the operation of the device.

The user operation information may include one or more operations customized by the user. The customized user operation may correspond to, for example, an action of a user of pressing a laundry mode button which configures a washing machine.

The device state information may include context information detected by one or more devices included in the device group or state information of one or more devices included in the device group. The device state information may include time information or approach information of a particular person. The time information may include a particular date, day of the week, time, or a combination thereof The approach information of the particular person may include information on an approach notification of an NFC tag belonging to the particular person. The device state information may include state changes of one or more devices included in the device group. The state change of the device refers to detection of a change of the device (for example, a thermostat) from one state (for example, high temperature) to another state (for example, normal temperature). That is, when the device state information includes the state change of the device, the device state information may include both of a past state and a current state of the device.

The recording period may be determined based on the device and the user operation information. For example, when the device is a refrigerator and the user operation information is high temperature, the recording period may be determined as three minutes. When the device is a refrigerator and the user operation information is lowering the temperature, the recording period may be determined as four minutes. In another example, when the device is a TV and an air conditioner, the recording period may be determined as thirty minutes regardless of the user operation information. When the device is the TV, the recording period may be determined as ten minutes regardless of the user operation information. The above example is only an example and may be implemented in a different form.

The recording period starts at a time point when the user operation information is received from the user device or before the time point and ends at the time point when the user operation information is received from the user device or after the time point. For example, when the user operation information is received at 10:00, the recording period may correspond to one of 09:50~10:00, 09:55~10:05, and 10:00~10:10.

The gateway device may determine device state information recorded a predetermined number of times (for example, five times) for a predetermined time period (for example, seven days) as the common device state information in operation 1220. The determination may be performed periodically or when a predetermined event is generated. The predetermined event may include redetection of a user input or reception of particular information. The predetermined time period may correspond to a time three times longer than the recording period or more. For example, the display unit may display device state information recorded seven times (the predetermined number of times) for two months (for the predetermined time period). The displayed device state information may be displayed in the form of name or icon. When the input unit detects a predetermined user input (for example, a selection input for the displayed device state information), the displayed device state information may be determined as the common device state information.

The gateway device may match and store the common device state information and the user operation information in operation 1230. When a request input for editing information is detected, the gateway device may display a user interface through which the stored common device state information and the user operation information may be edited. When a selection input of the device through the user interface is detected, the stored common device state and user operation information corresponding to the selected device may be displayed in the form of name or icon. The user may select information to be edited from the displayed common device state information and user operation information.

When device state information received from the device group matches the common device state information, the gateway device may generate a request for executing the operation corresponding to the user operation information to the device in operation 1240. Accordingly, the device executes the requested operation.

Figure 13:
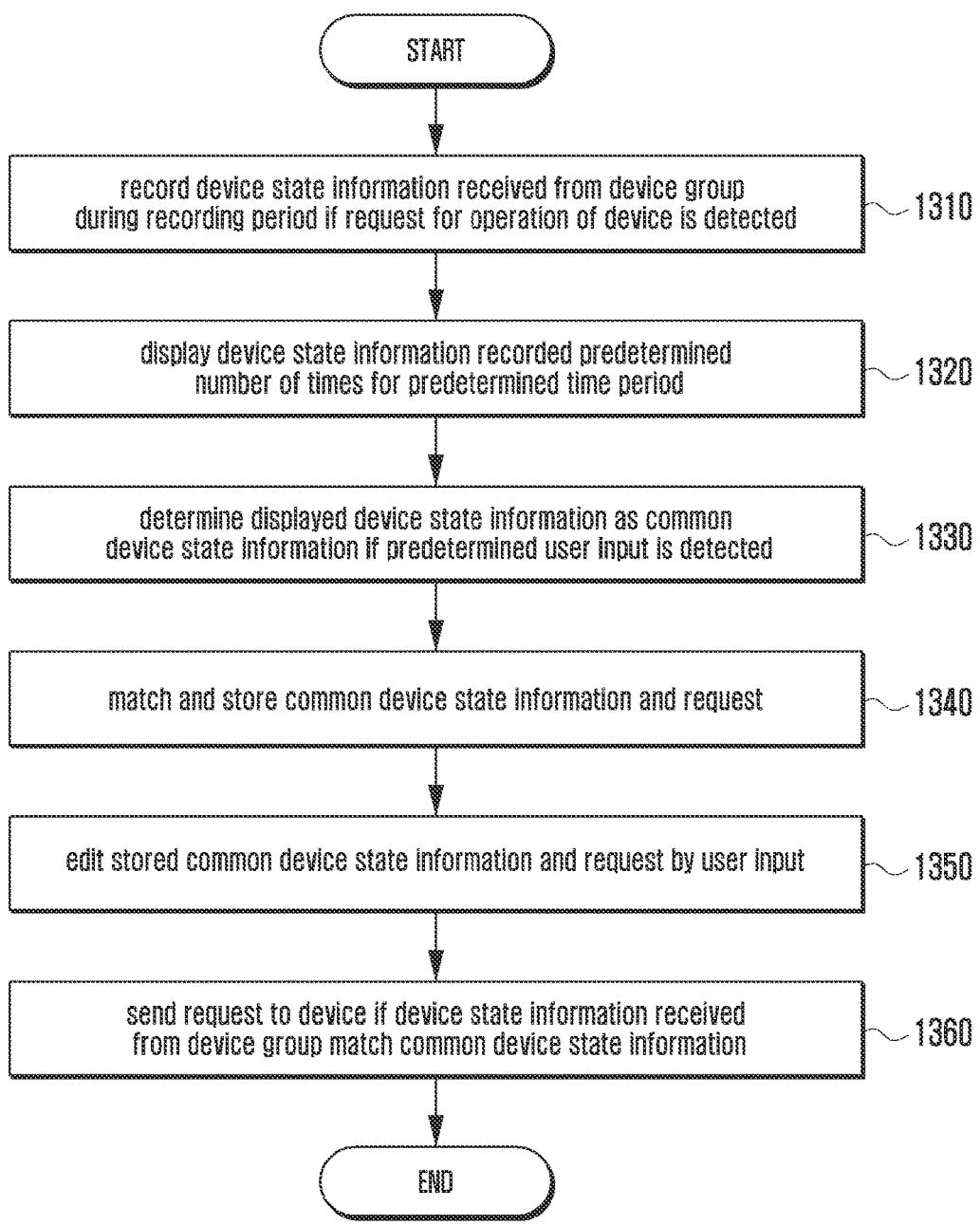
FIG. 13 is a flowchart illustrating a process in which the user device controls another device according to an embodiment of the present disclosure

FIG. 13 is a flowchart illustrating a process in which the user device controls another device according to an embodiment of the present disclosure.

Referring to FIG. 13, when the user device of the smart home system receives a request for an operation of a device, the user device records device state information received from a device group during a recording period in operation 1310. The device group may include one or more devices.

The operation may include a user operation for the device. The operation information may include one or more operations customized by the user. The user customized operation may correspond to, for example, an action of a user of pressing a laundry mode button which configures a washing machine.

The device state information may include context information detected by one or more devices included in the device group or state information of one or more devices included in the device group. The device state information may include time information or approach information of a particular person. The time information may include a particular date, day of the week, time, or a combination thereof The approach information of the particular person may include information on an approach notification of an NFC tag belonging to the particular person. The device state information may include state changes of one or more devices included in the device group. The state change of the device refers to detection of a change of the device (for example, a thermostat) from one state (for example, high temperature) to another state (for example, normal temperature). That is, when the device state information includes the state change of the device, the device state information may include all of a past state and a current state of the device.

The recording period may be determined based on the request and the device. For example, when the user device is a smart phone, the device is a refrigerator, and the request is raising temperature, the recording period may be determined as five minutes. On the other hand, when the request is lowering the temperature, the recording period may be determined as six minutes. In another example, when the user device is a TV and the device is an air conditioner, and the recording period may be fixed as thirty minutes regardless of the request. When the device is the TV, the recording period may be determined as ten minutes regardless of the request. The above example is only an example and may be implemented in a different form.

The recording period starts at a time point when the request is detected or before the time point and ends at the time point when the request is detected or after the time point. For example, when the request is detected at 10:00, the recording period may correspond to one of 09:50~10:00, 09:55~10:05, and 10:00~10:10.

The user device may display device state information recorded a predetermined number of times (for example, five times) for a predetermined time period (for example, one month) in operation 1320. The predetermined time period may correspond to a time three times longer than the recording period or more. When the input unit detects a predetermined user input (for example, a selection input for the displayed device state information), the displayed device state information may be determined as the common device state information in operation 1330. The displayed device state information may be displayed in the form of name or icon.

The user device may match and store the common device state information and the request in operation 1340. When a request input for editing information is detected, the user device may display a user interface through which the stored common device state information and the request may be edited. When a selection input of the device through the user interface is detected, the stored common device state and request corresponding to the selected device may be displayed in the form of name or icon. The user may select information to be edited from the displayed common device state information and the request in operation 1350.

When device state information received from the device group matches the common device state information, the user device may send the request to the device in operation 1360. Accordingly, the device executes the requested operation.

Figure 14:
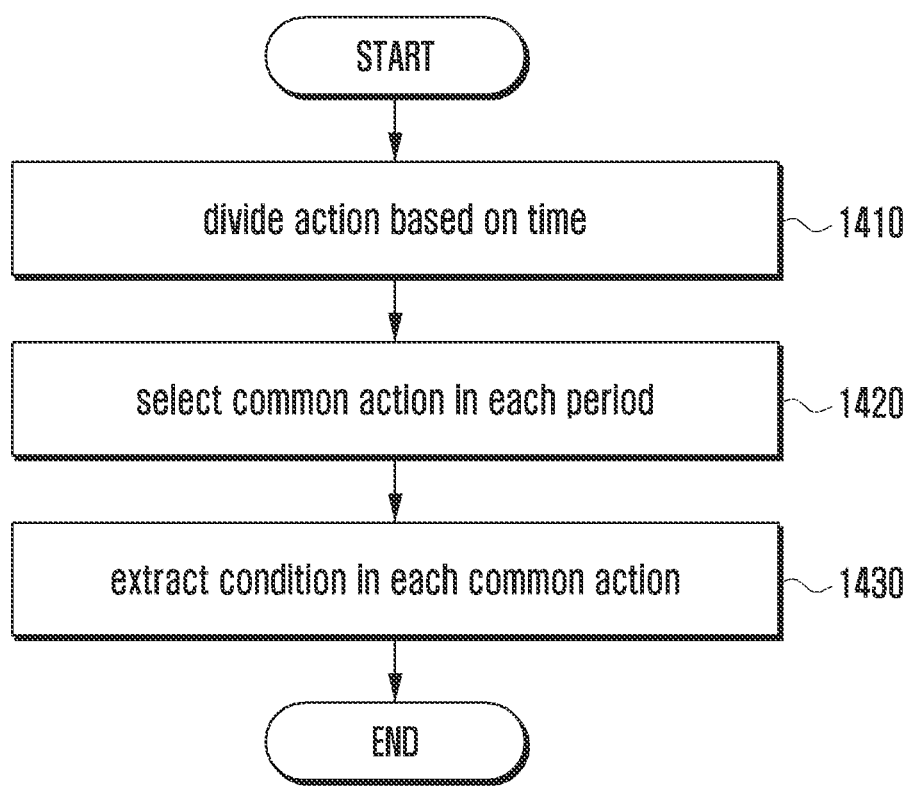
FIG. 14 is a flowchart illustrating a device action using context according to another embodiment of the present disclosure.

FIG. 14 is a flowchart illustrating a device action using context according to another embodiment of the present disclosure.

Referring to FIG. 14, for a device action using context, the gateway may divide a past action into action periods (recording periods) on the time in operation 1410, extract an action in each of the action periods in operation 1420, and extract a condition for each of the actions in operation 1430.

Various aspects of the present disclosure may also be embodied as computer readable code on a non-transitory computer readable recording medium. A non-transitory computer readable recording medium is any data storage device that may store data which may be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium may also be distributed over network coupled computer systems so that the computer readable code is stored and executed in a distributed fashion. Also, functional programs, code, and code segments for accomplishing the present disclosure may be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums may also be distributed over network coupled computer systems so that the instructions are stored and executed in a distributed fashion. Also, functional computer programs, instructions, and instruction segments for accomplishing the present disclosure may be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a device by a control device, the method comprising:
   recording, if operation information is received from a second device, device state information of a device group including a first device;
   determining common device state information of the device group based on the recorded device state information of the device group; and
   sending, if the device state information of the first device matches the common device state information of the device group, a control command to the second device for executing an operation of the second device based on the common device state information of the device group.

2. The method of claim 1, wherein the determining of the common device state information of the device group comprises:
   displaying the device state information of the device group based on a number of the recordings; and
   determining, if a predetermined input is detected, the displayed device state information of the device group as the common device state information of the device group.

3. The method of claim 1, wherein a recording period is determined based on the second device and the operation information.

4. The method of claim 1, wherein a recording period starts at or before a time point when the operation information is received from the second device, and the recording period ends at or after the time point.

5. The method of claim 1, further comprising:
   matching and storing the common device state information of the device group and the operation information.

6. The method of claim 1, wherein the device state information of the device group includes at least one of time information or approach notification information of a particular person.

7. The method of claim 1, wherein the device state information of the device group includes state changes of at least one device included in the device group.

8. The method of claim 1, further comprising:
   matching and storing the common device state information of the device group and the control command; and
   editing the stored common device state information of the device group and control command according to an input.

9. The method of claim 8, wherein the editing of the stored common device state information of the device group and the control command comprises displaying, when a device selection input is detected, the stored common device state information of the device group and the control command corresponding to the selected device in a form of at least one of a name or an icon.

10. The method of claim 1, wherein the operation information includes a user customized operation.

11. The method of claim 1, wherein the sending of the control command to the second device comprises:
    sending, if the device state information of the first device matches the common device state information of the device group, the control command to the second device for executing an operation, corresponding to the operation information of the second device.

12. The method of claim 1, further comprising:
    sending, if the device state information of the first device matches the common device state information of the device group, a notification to the second device for executing the operation of the second device based on the common device state information of the device group.

13. A method by a second device, the method comprising:
    sending, to a control device, if an operation of the second device is detected, operation information; and
    receiving, from the control device, if device state information of a first device included in a device group is matched to common device state information of the device group, a control command for executing an operation corresponding to the operation information of the second device,
    wherein the common device state information of the device group is determined based on recorded device state information of the device group by the control device, if the operation information is received by the control device.

14. A control device controlling a device, the control device comprising:
    a transceiver configured to transmit or receive information to or from the first device;
    a storage configured to store the information; and
    a controller configured to:
       record device state information of a device group including a first device, if operation information is received from a second device,
       determine common device state information of the device group based on the recorded device state information of the device group, and
       send a control command to the second device for executing an operation of the second device based on the common device state information of the device group, if device state information of the first device matches the common device state information of the device group.

15. The control device of claim 14, wherein the control device further comprises:
    an input unit configured to detect an input; and
    a display configured to display information,
    wherein the controller is further configured to:
       control the display to display device state information of the device group based on a number of the recordings, and
       determine common device state information of the device group based on the displayed device state information of the device group, if the input unit detects a predetermined input.

16. The control device of claim 15, wherein the controller is further configured to:
    control the storage to match and store the common device state information of the device group and the control command, and
    control the display to display a user interface through which the stored common device state information of the device group and control command are edited.

17. The control device of claim 16, wherein, if the input unit detects a device selection input, the controller is further configured to control the display to display the stored common device state information of the device group and the control command corresponding to the selected device in a form of at least one of a name or an icon.

18. The control device of claim 14, wherein a recording period is determined based on the second device and the operation information.

19. The control device of claim 14, wherein a recording period starts at or before a time point when the operation information is received from the second device, and the recording period ends at or after the time point.

20. The control device of claim 14, wherein the controller is further configured to control the storage to match and store the common device state information of the device group and the operation information.

21. The control device of claim 14, wherein the device state information of the device group includes at least one of time information or approach notification information of a particular person.

22. The control device of claim 14, wherein the device state information of the device group includes state changes of at least one device included in the device group.

23. The control device of claim 14, wherein the operation information includes a user customized operation.

24. The control device of claim 14, wherein the controller is further configured to send, if the device state information of the first device matches the common device state information of the device group, the control command to the second device for executing the operation, corresponding to the operation information of the second device.

25. The control device of claim 14, wherein the controller is further configured to send, if the device state information of the first device matches the common device state information of the device group, a notification to the second device for executing the operation of the second device based on the common device state information of the device group.

26. A second device comprising:
a transceiver configured to transmit or receive information to or from a control device;
a storage configured to store the information; and
a controller configured to:
   send, to the control device, if an operation of the second device is detected, operation information, and
   receive, from the control device, if device state information of a first device included in a device group is matched to common device state information of the device group, a control command for executing an operation corresponding to the operation information of the second device,
wherein the common device state information of the device group is determined based on recorded device state information of the device group by the control device, if the operation information is received by the control device.

27. A method by a control device, the method comprising:
recording, if detecting information is received from a detecting device, device state information of a device group;
determining common device state information of the device group based on the recorded device state information of the device group; and
sending, if the detecting information is received from the detecting device, a control command to each device of the device group for executing an operation of the each device of the device group based on the common device state information of the device group.

28. A control device, the control device comprising:
a transceiver configured to transmit or receive information to or from a detecting device;
a storage configured to store the information; and
a controller configured to:
   record, if detecting information is received from the detecting device, device state information of a device group,
   determine common device state information of the device group based on the recorded device state information of the device group, and
   send, if the detecting information is received from the detecting device, a control command to each device of the device group for executing an operation of the each device of the device group based on the common device state information of the device group.

* * * * *